(12) United States Patent
Ingolfsson et al.

(10) Patent No.: US 11,717,799 B2
(45) Date of Patent: Aug. 8, 2023

(54) CONTINUOUS FLOW SYSTEM FOR THE PRODUCTION AND PURIFICATION OF BIODIESEL

(71) Applicant: YMIR TECHNOLOGIES EHF., Reykjavik (IS)

(72) Inventors: Oddur Ingolfsson, Kopavpgur (IS); Asgeir Matthiasson, Reykjavik (IS); Eirikur Bjarnason, Kopavogur (IS); Sigurdur Ingolfsson, Kopavogur (IS)

(73) Assignee: YMIR TECHNOLOGIES EHF., Reykjavik (IS)

( * ) Notice: Subject to any disclaimer, the term of this patent is extended or adjusted under 35 U.S.C. 154(b) by 0 days.

(21) Appl. No.: 17/593,394

(22) PCT Filed: Mar. 20, 2020

(86) PCT No.: PCT/IS2020/050011
§ 371 (c)(1),
(2) Date: Sep. 17, 2021

(87) PCT Pub. No.: WO2020/188608
PCT Pub. Date: Sep. 24, 2020

(65) Prior Publication Data
US 2022/0143567 A1 May 12, 2022

(30) Foreign Application Priority Data
Mar. 20, 2019 (IS) .......................... 050257

(51) Int. Cl.
*B01J 8/02* (2006.01)
*B01J 8/00* (2006.01)
(Continued)

(52) U.S. Cl.
CPC .................. *B01J 8/02* (2013.01); *B01D 3/06* (2013.01); *B01D 15/361* (2013.01);
(Continued)

(58) Field of Classification Search
CPC .... B01D 15/361; B01D 17/0214; B01D 3/06; B01J 2208/00017; B01J 2208/00539;
(Continued)

(56) References Cited

U.S. PATENT DOCUMENTS

2002/0106311 A1 * 8/2002 Golbig .................. B01F 33/813
422/601
2007/0053808 A1 3/2007 Markowz et al.
(Continued)

FOREIGN PATENT DOCUMENTS

CN 201144226 Y 11/2008
CN 101067091 B 5/2010
(Continued)

OTHER PUBLICATIONS

Tran et al., "Recent insights into continuous-flow biodiesel production via catalytic and non-catalytic transesterification proscesses", The Institute of Engineering and Technology, Database Accession No. 16829086, 2 pages. Jan. 1, 2017.
(Continued)

*Primary Examiner* — Ellen M McAvoy
*Assistant Examiner* — Chantel L Graham
(74) *Attorney, Agent, or Firm* — Heslin Rothenberg Farley & Mesiti PC

(57) ABSTRACT

Provided is a system and method for producing and purifying biodiesel. In particular, the system comprises a tandem arrangement of at a modular biodiesel reactor and a continuous flow separation and purification unit. The system can further comprise an evaporation unit that is placed between the biodiesel reactor and the continuous flow separation and purification unit.

39 Claims, 11 Drawing Sheets

(51) Int. Cl.
  *C11C 3/00* (2006.01)
  *C10L 1/02* (2006.01)
  *B01D 17/02* (2006.01)
  *B01D 15/36* (2006.01)
  *B01D 3/06* (2006.01)

(52) U.S. Cl.
  CPC .......... *B01D 17/0214* (2013.01); *B01J 8/001* (2013.01); *B01J 8/0278* (2013.01); *B01J 8/0285* (2013.01); *C10L 1/026* (2013.01); *C11C 3/003* (2013.01); *B01J 2208/00017* (2013.01); *B01J 2208/00539* (2013.01); *B01J 2208/00601* (2013.01); *C10L 2200/0476* (2013.01); *C10L 2270/026* (2013.01)

(58) Field of Classification Search
  CPC .... B01J 2208/00601; B01J 8/001; B01J 8/02; B01J 8/0278; B01J 8/0285; C10L 1/026; C10L 2200/0476; C10L 2270/026; Y02E 50/10
  See application file for complete search history.

(56) References Cited

U.S. PATENT DOCUMENTS

| | | |
|---|---|---|
| 2007/0214712 A1 | 9/2007 | Garwood |
| 2015/0027036 A1 | 1/2015 | Janajreh et al. |

FOREIGN PATENT DOCUMENTS

| | | | |
|---|---|---|---|
| CN | 106800976 A | 6/2017 | |
| EP | 1889899 A1 * | 2/2008 | ............. C07C 67/03 |
| EP | 1889899 A1 | 2/2008 | |
| EP | 2457648 A2 | 5/2012 | |
| TW | 201125969 A1 | 8/2011 | |
| WO | 2006089429 A1 | 8/2006 | |
| WO | 2008055131 A2 | 5/2008 | |

OTHER PUBLICATIONS

Written Opinion and International Search Report in International Application No. PCT/IS2020/050011, 15 pages, dated Jul. 14, 2020.
Search Report—Iceland in IS Application No. 050257, 2 pages, dated Jul. 30, 2019.

* cited by examiner

CONTINUOUS FLOW SYSTEM FOR THE PRODUCTION AND PURIFICATION OF BIODIESEL

CROSS REFERENCE TO RELATED APPLICATIONS

This application is a National Stage application under 35 U.S.C. § 371 of PCT Application No. PCT/IS2020/050011, filed Mar. 20, 2020, which claims priority to Iceland Application No. 050257 filed Mar. 20, 2019. The contents of each of these applications are hereby incorporated by reference herein in their entirety.

FIELD OF INVENTION

The current invention relates to a system and method for the production and purification of biodiesel from glycerides and/or free fatty acids in a continuous-flow system.

INTRODUCTION

Biodiesel is currently mainly produced in a batch process through base catalyzed transesterification of glycerides, using vegetable oils as feedstock. The direct base catalyzed transesterification requires high quality feedstock with low water content and low free fatty acid content (generally <2%).

The main feedstock in 2017 was palm and soya oil and the total world production was close to 30 billion liters (Statista GmbH Johannes-Brahms-Platz 1, 20355 Hamburg. Germany. From https://www.statista.com/statistics/271472/biodiesel-production-in-selected-countries/21.02.2019)

Generally, the profit margins in biodiesel productions are slim and the production facilities need to be large to be economical. The main cost is that of the feedstock and the use of high-grade vegetable oils puts the biodiesel industry in competition with the food industry and promotes increased land-use for monoculture. These are adverse effects that minder the environmental and cultural benefits of using biodiesel as a substitute for conventional fossil diesel fuel. In response, the biodiesel industry is currently increasingly moving to using waist oil and waist fat. Most noticeably used cooking oil and fat from rendered slaughterhouse waist are being used as feedstock as replacement for the currently dominating high quality vegetable oils. This reduces the raw material (feedstock) cost significantly and puts the biodiesel produced in and environmentally less ambiguous position. However, using such lower grade material puts additional strain on the production process, demanding pretreatment for particles and water removal. And, where the feedstock is hydrolytically degraded, an additional production step is needed to remove or convert free fatty acids to the respective alkyl esters prior to the base catalyzed transesterification. This is generally achieved through neutralization or through acid catalyzed esterification of the free fatty acids, reducing their content to less than 2% and thus avoiding adverse soap formation in the proceeding base catalyzed transesterification.

In conventional biodiesel production, in a homogeneously catalyzed batch process, the raw biodiesel produced contains remaining excess alcohol (generally methanol), the byproduct glycerol (generally about 1:3 molar ratio), the remaining catalyst and some saponified fatty acids (soap). These byproducts need to be removed and partly refined for reuse (alcohol/methanol) or offset to other industries as raw material (glycerol). The glycerol can at large be removed through sedimentation and the alcohol (methanol) through evaporation. Catalyst and soaps can be removed through washing with water or by means of ion exchange resins. Specially, where sedimentation and washing is applied for purification of the raw biodiesel, these steps put considerable strain on the production process, require high volume capacity for separation tanks and/or may be the limiting factor with respect to throughput.

Continuous flow biodiesel production, especially such where purification of the raw product is integrated into the continuous flow, may be adventitious over batch production by requiring less tank volume and floor-space for same throughput, being more automatic in operation and thus requiring less man power and providing more consistent product quality. Several approaches have been taken in the laboratory and at semi-scale with continuous flow biodiesel production. These include approaches such as oscillatory reactor, microchannel, laminar flow, liquid-liquid film and membrane reactors as well as supercritical processes and reactive distillation. A good overview of the current state of the art is given by Dang-Thuan Tran, Jo-Shu Chang and Duu-Jong Lee in Applied Energy 185 (2017) 376-409. These approaches have, however, not found their way into large scale commercial facilities to any noticeable extent.

SUMMARY

The system of the invention relates to a continuous flow biodiesel production and purification system comprising a modular biodiesel reactor and a continuous-flow separation purification unit that preferably comprises wet and dry washing and purification in one column in tandem combined in a single system with an intermediate flash evaporation unit where advantageous.

The continuous-flow reactor is explicitly constructed to allow for flexible, effective and economical conversion of low-grade feed stock of variable composition ranging in free fatty acid (FFA) and glyceride ratio from 0-1. The biodiesel reactor of the invention provides a continuous-flow reaction system applicable to; i) a wide range of throughput and catalyst composition and catalytic contact time requirements, ii) a large pressure and temperature range and efficient heat transfer, iii) high degree of flexibility in catalyst composition and structure, iv) high degree of flexibility in constellation, maintenance and catalyst regeneration.

Said continuous-flow reactor is modular and is composed of three principal components; i) corrugated contact plates alternatively with one side or both sides coated with catalytic material), ii) spacers, alternatively with catalytic and flow perturbing inner surfaces and iii) static mixers alternatively with catalytic surfaces.

In an aspect the invention provides a continuous flow biodiesel production and purification system comprising a tandem (i.e., sequential) arrangement comprising at least one continuous flow modular biodiesel reactor unit and at least one continuous flow separation and purification unit.

The biodiesel reactor preferably receives a continuous flow fat and/or oil, composed of glycerides and free tatty acids) and reacts that stream of fat and/or oil with methanol, ethanol or propanol, thereby producing a continuous flow of biodiesel.

The invention further provides a method for the continuous production of biodiesel, the method comprising steps of (a) providing a continuous stream of reactants comprising free fatty acids and/or fatty acid glycerides comprising fat and/or oil into a biodiesel reactor, where the reactants are reacted with at least one alcohol and thus converted into fatty acid esters and/or transesterified fatty acid glycerides; (b) removing excess alcohol and/or water by evaporation to provide crude biodiesel; and (c) converting the resulting crude biodiesel to purified biodiesel by a continuous process that includes at least one separation step and at least one one washing and purification step.

In further aspects, the invention also relates to individual components (units) of the continuous flow biodiesel production and purification system as described herein.

Thus, another aspect relates to a continuous flow separation and purification unit comprising, in one column, at least one continuous flow separation unit, at least one wet washing unit and at least one purification unit.

Another aspect relates to a biodiesel reactor unit that is adapted to receive a continuous stream of fat and/or oil, reacting that stream with at least one alcohol such as methanol, ethanol or propanol to generate a continuous flow of biodiesel.

A further aspect relates to a biodiesel reactor unit comprising a plurality of contact plates coated with at least one esterification and/or transesterification catalyst for catalyzing esterification of free fatty acids and or transesterification of glycerides.

Another aspect relates to a biodiesel reactor unit comprising a plurality of coated contact plates, coted spacers and coated static plate mixers, whereby esterification of reagents is effectuated with a heterogeneous solid state catalysis or enzymatic catalysis.

Yet another aspect relates to a continuous-flow biodiesel reactor unit that comprises non-coated contact plates, spacers and static mixers, whereby esterification of reagents is effectuated with a homogeneous acid catalyst. The biodiesel reactor unit may conveniently be provided as at least two reactors, wherein esterification with a homogeneous acid catalyst is effectuated in at least a first reactor and transesterification with a homogeneous basic catalyst is effectuated in at least a second reactor.

The continuous flow biodiesel reactor in accordance with the invention can in general be provided with or without a pre-mixing inlet system. Such systems can be convenient for allowing mixing of reactants prior to and/or during their delivery into a biodiesel reactor.

Accordingly, a further aspect relates to a biodiesel reactor unit that is adapted to receive a continuous stream of fat and/or oil, reacting that stream with at least one alcohol such as methanol, ethanol or propanol to generate a continuous flow of biodiesel, wherein the biodiesel reactor unit further comprises a pre-mixing inlet system for allowing mixing of reactants prior to and/or during their delivery into the reactor unit.

Further aspects of the invention relate to continuous flow biodiesel reactors that are provided within a pressure equalizing chamber. In general, any biodiesel aspect or embodiments thereof as described herein can be advantageously provided within such chambers.

Accordingly, a further aspect of the invention relates to a continuous-flow biodiesel reactor unit for receiving a continuous stream of fat and/or oil, reacting that stream with at least one alcohol such as methanol, ethanol or propanol to generate a continuous flow of biodiesel, wherein the biodiesel reactor unit is enclosed within a differential pressure equalizing chamber, thereby enabling high-pressure or ultra-high-pressure operation of the biodiesel reactor.

The system, including its biodiesel reactor, is modular allowing for replacement of individual components for their maintenance and catalyst regeneration, where these components are coated with solid-state catalysts. This provides for minimum down time in operation as individual components may be replaced on site and regenerated and used in the next scheduled maintenance/regeneration round.

Further, the system can be configured to include any combination of individual units as described herein. Thus, the system can include one or more biodiesel reactor unit as described herein, in combination with one or more continuous flow separation and purification unit as described herein. The system can further comprise one or more pre-mixing inlet system as described herein. The system can additionally, or alternatively, also include one or more evaporator unit, that can preferably be placed between a continuous flow biodiesel reactor unit and a continuous-flow separation and purification unit (e.g., a continuous flow separation and and wet and dry washing and purification column).

The continuous-flow separation and wet and dry washing and purification in one column is preferably composed of three section; i) a separation section where the heavier glycerol phase separates from the lighter biodiesel through sedimentation, ii) a whet washing section where the rising biodiesel is subjected to a wet, water wash realized through a spraying armature emerged in the rising biodiesel around the middle of the column and iii) a dry wash, purification section placed in the top ⅓ of the column, where the pre-washed biodiesel rises through a section packed with ion exchange resin(s) or other resins or purification gels to preferably result in a dry biodiesel product meeting all relevant standards and not needing further purification.

Where advantageous, specifically where excess alcohol is used in the esterification/transesterification process, a flash evaporator may preferably be placed between the continuous flow biodiesel reactor and the continuous-flow separation and wet and dry washing and purification column.

BRIEF DESCRIPTION OF FIGURES

The skilled person will understand that the drawings, described below, are for illustration purposes only. The drawings are not intended to limit the scope of the present teachings in any way.

DETAILED DESCRIPTION

In the following, exemplary embodiments of the invention will be described, referring to the figures. These examples are provided to provide further understanding of the invention, without limiting its scope.

In the following description, a series of steps are described. The skilled person will appreciate that unless required by the context, the order of steps is not critical for the resulting configuration and its effect. Further, it will be apparent to the skilled person that irrespective of the order of steps, the presence or absence of time delay between steps can be present between some or all of the described steps.

In the following description, numerals (e.g. 1000) refer to individual components of the system, while combined alphabetical and numeric descriptors (e.g, S01) refer to flow (e.g., reagents, products, thermal fluid) in the system, e.g., DS01 refers to data streams.

Figure 1:
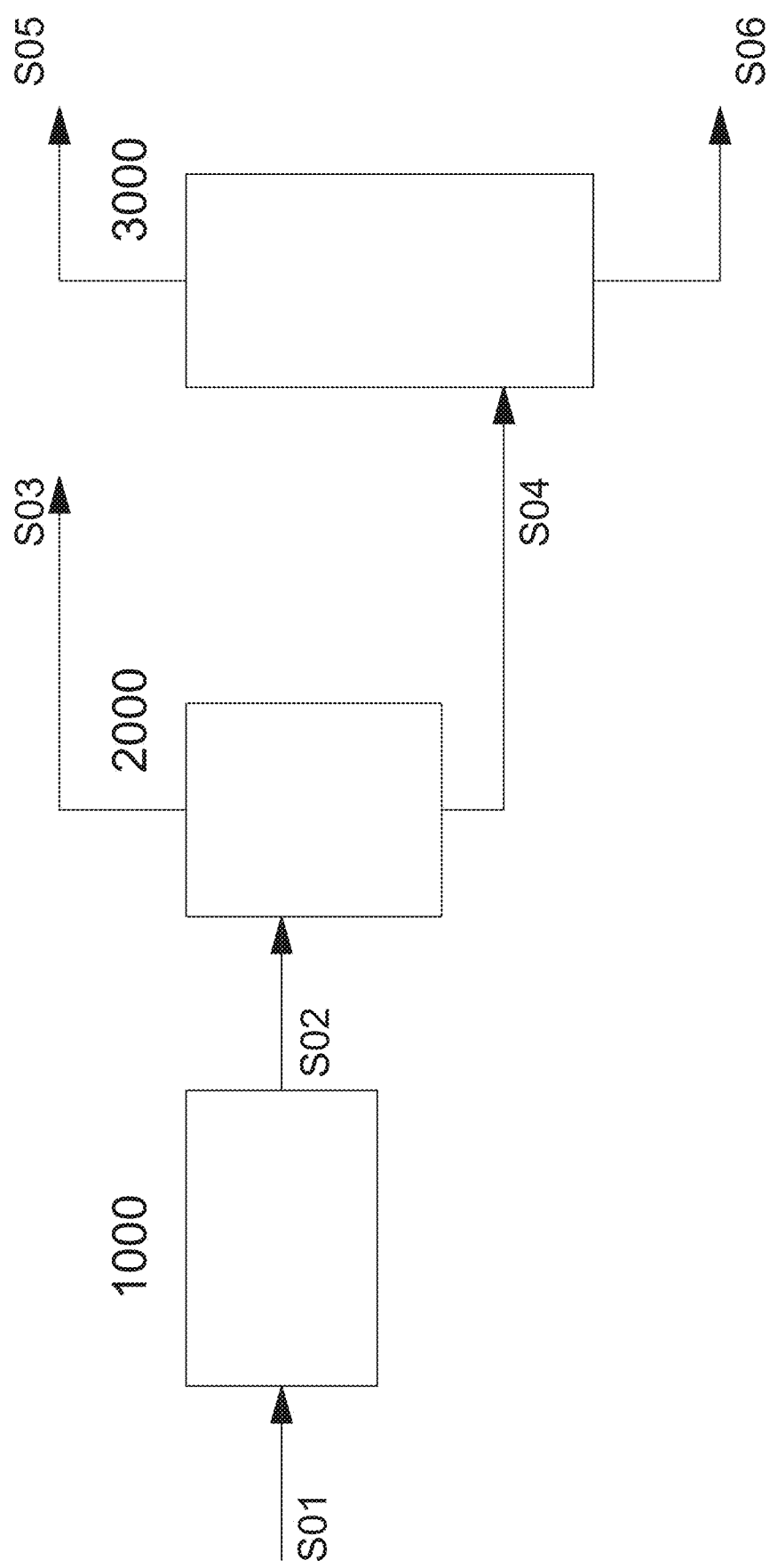
FIG. 1 shows a schematic flow diagram depicting the main units of the system of the invention, representing an embodiment including a flash-evaporation unit.

In an embodiment of the invention, shown schematically in a flow diagram in FIG. 1, the continuous flow biodiesel production system comprises a modular, continuous flow biodiesel reactor (1000), a flash evaporation drum (2000) and a continuous separation and wet and dry washing and purification section combined in one column (3000).

In this embodiment, the reactants, comprising the free fatty acids and/or glycerides to be converted, lower alcohols such as methanol or ethanol and in some embodiments a homogenous catalyst and co-solvent (S01), are premixed in a static mixer system (1100, see FIG. 2) before being actively transferred to the continuous flow biodiesel reactor (1200). In the continuous flow biodiesel reactor, esterification of the free fatty acids and/or transesterification of the glycerides is effectuated, preferably at elevated temperature and pressure. The converted reactant mixture is released into a flash evaporation drum (2000), at the exit of the continuous flow biodiesel reactor (S02 from 1000), for removal of the bulk of the surplus alcohol and of water, through evaporation (S03). The flash evaporation drum is equipped with a heat-exchanging condenser, preferably enabling at least partial heat recovery for use in other steps of the process, such as pre-heating of the reactant mixture. The raw (i.e., crude) biodiesel product accumulates in the flash evaporation drum (2000) and is actively transferred to the continuous separation and wet and dry washing and purification section (S04 to 3000), which is combined in one column. In the combined separation and wet and dry washing and purification section (3000) the glycerol-phase is separated through sedimentation and the biodiesel phase is washed with water and purified with a suitable resin or combination of resins and/or purification gels, in a continuous fashion. The washed and purified final biodiesel product is reclaimed from the top of the column (S05), while the heavier glycerol containing fraction (G-phase), also containing the washing water and impurities, is discharged from the bottom of the column (S06) and may be further processed for value added-products.

Figure 2:
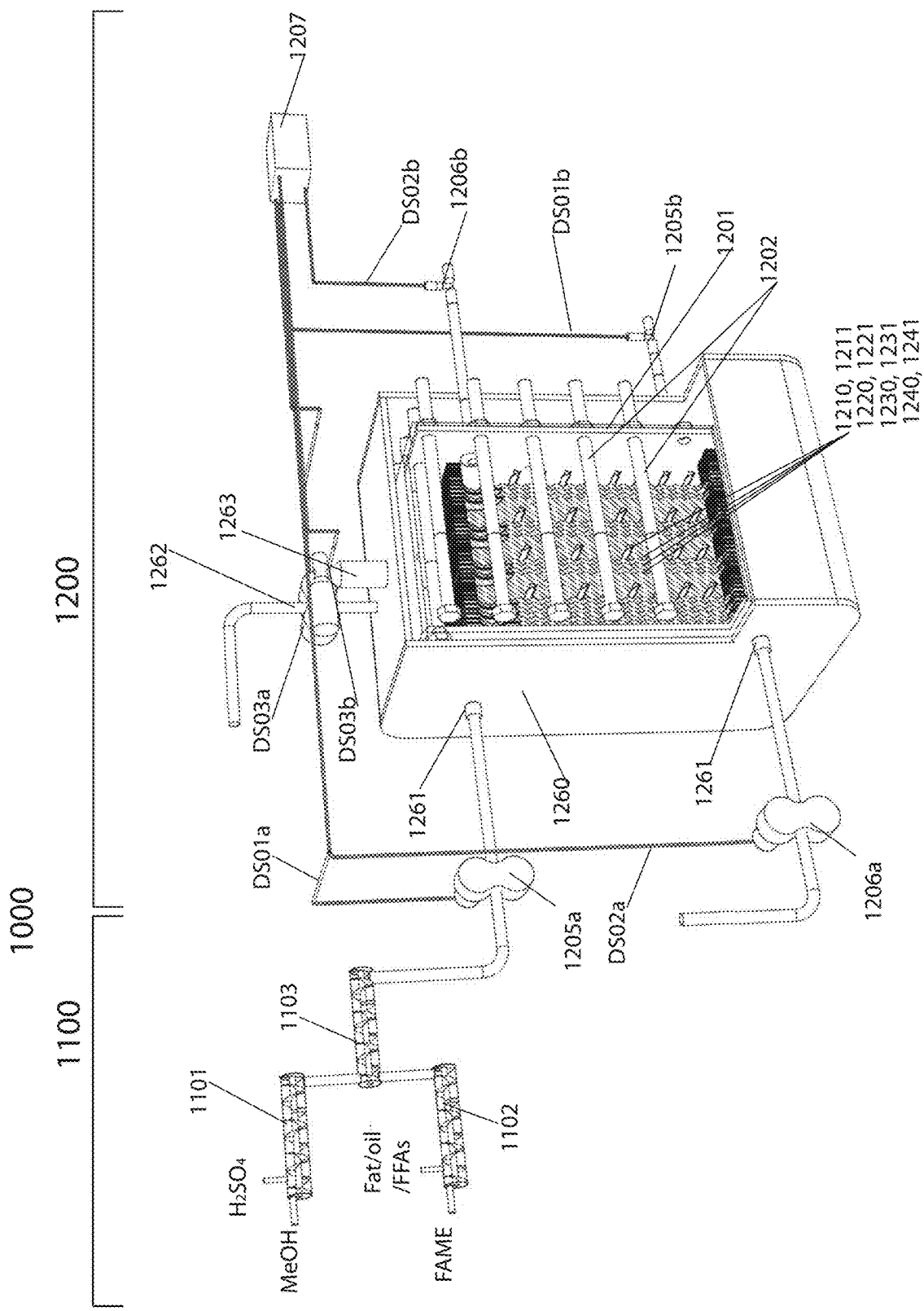
FIG. 2 shows a perspective overview of the continuous-flow biodiesel reactor unit of the invention.

The continuous-flow biodiesel reactor shown exemplary in FIG. 2 is equipped with a pre-mixing inlet system (1100) constructed to allow for effective mixing of the reactants prior to or during the injection into the reactor and alternatively the adding of homogeneous catalysts and/or of co-solvents where appropriate. Such co-solvent is preferably methyl esters produced in the process and partly re-circulated, promoting the formation of a homogeneous reaction mixture of methanol, glycerides and free fatty acids.

An example of the utilization of the pre-mixing system (1100) is shown in FIG. 2. In this example sulphuric acid is premixed with methanol (1101) as homogeneous catalyst or for activation of a solid-state catalyst, as described herein below. This serves at the same time to harvest the solvation energy released in this process. In another pre-mixer of the system (1102), the free fatty acids and glycerides are mixed with a co-solvent such as fatty acid methyl esters that may be produced in the process, or other co-solvent. The respective blends are then mixed in a third pre-mixer (1103).

Figure 3:
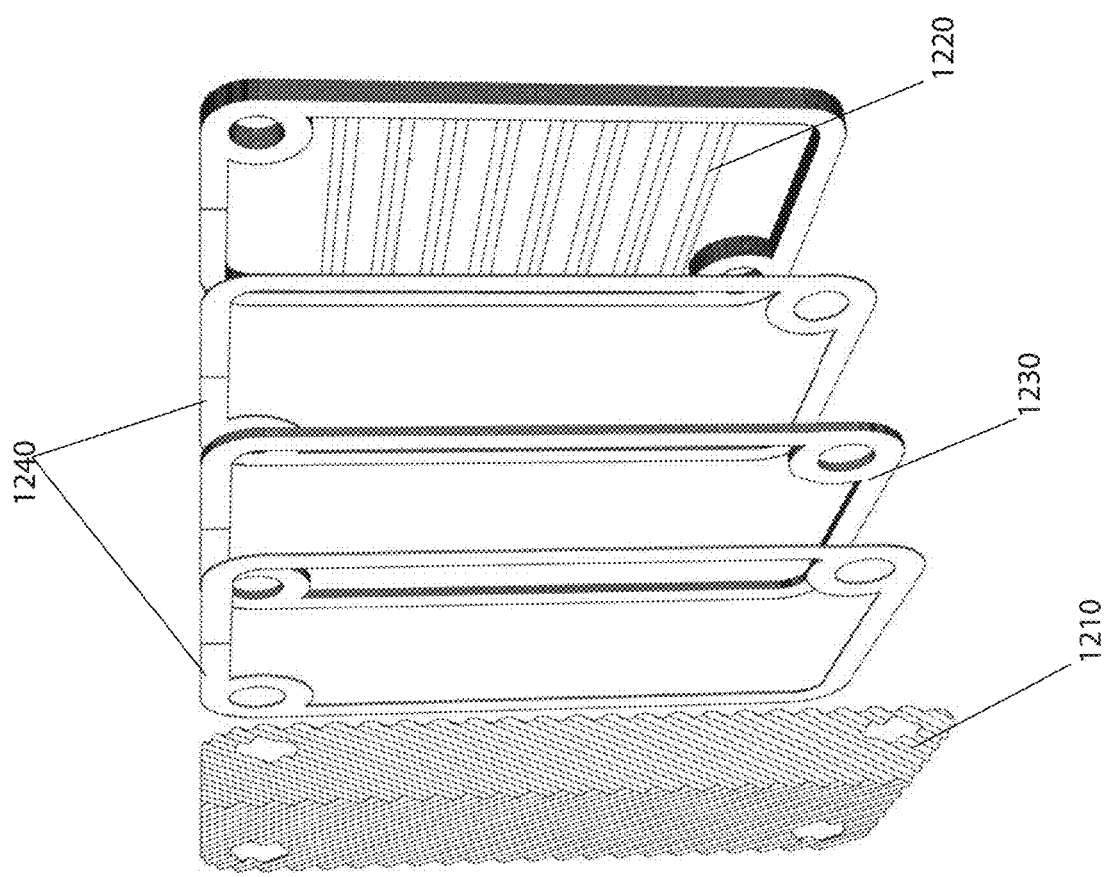
FIG. 3 shows further details of the continuous-flow biodiesel reactor unit from FIG. 2, illustrating the principal components: a contact plate, static plate mixers, spacers and sealing gaskets.
Figure 4:
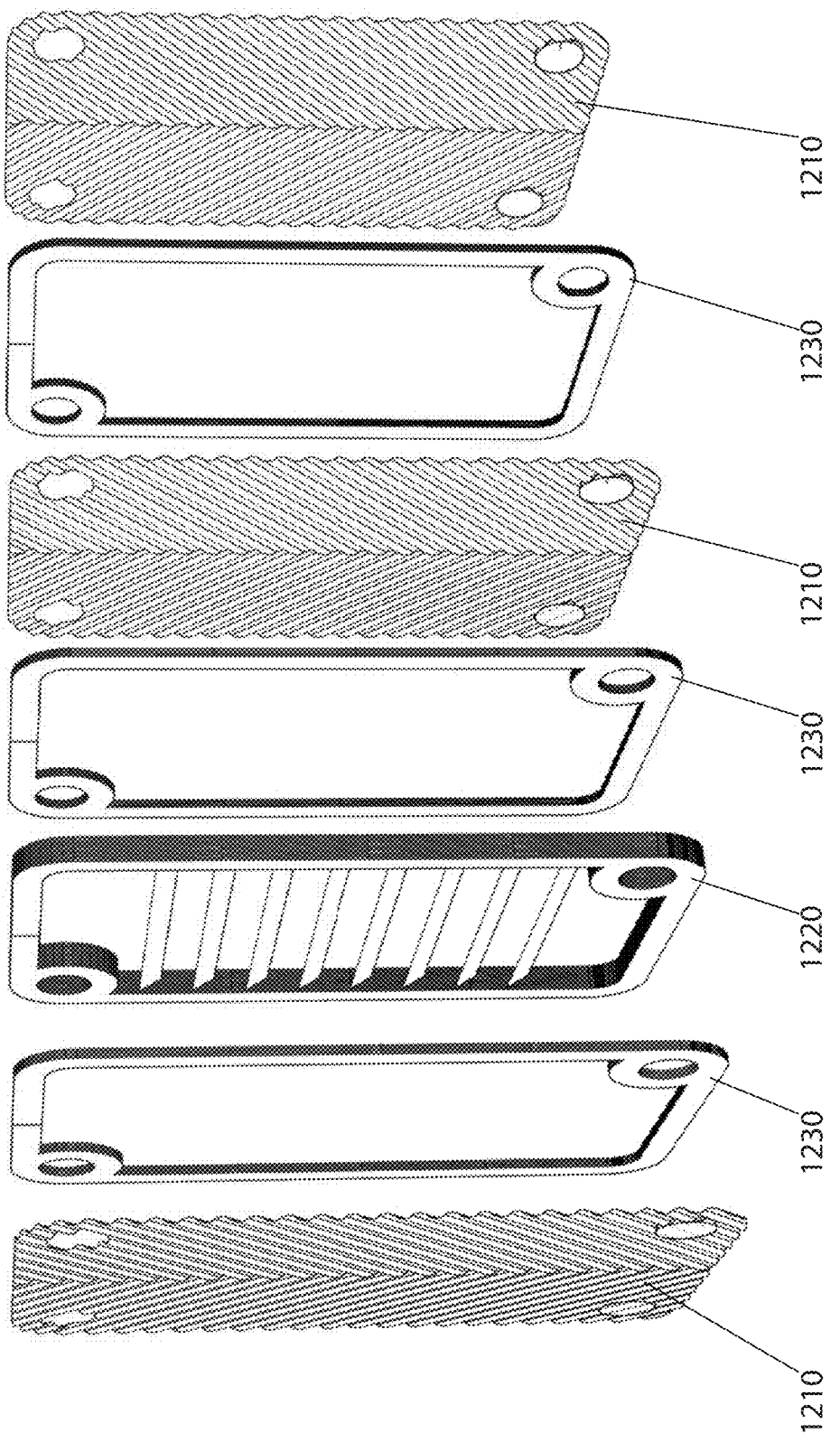
FIG. 4 shows further details of the continuous-flow biodiesel reactor, from FIG. 2, illustrating exemplary stacking of the components of the reactor to form one reaction cell and on adjacent thermal cell (sealings are not shown).
Figure 5:
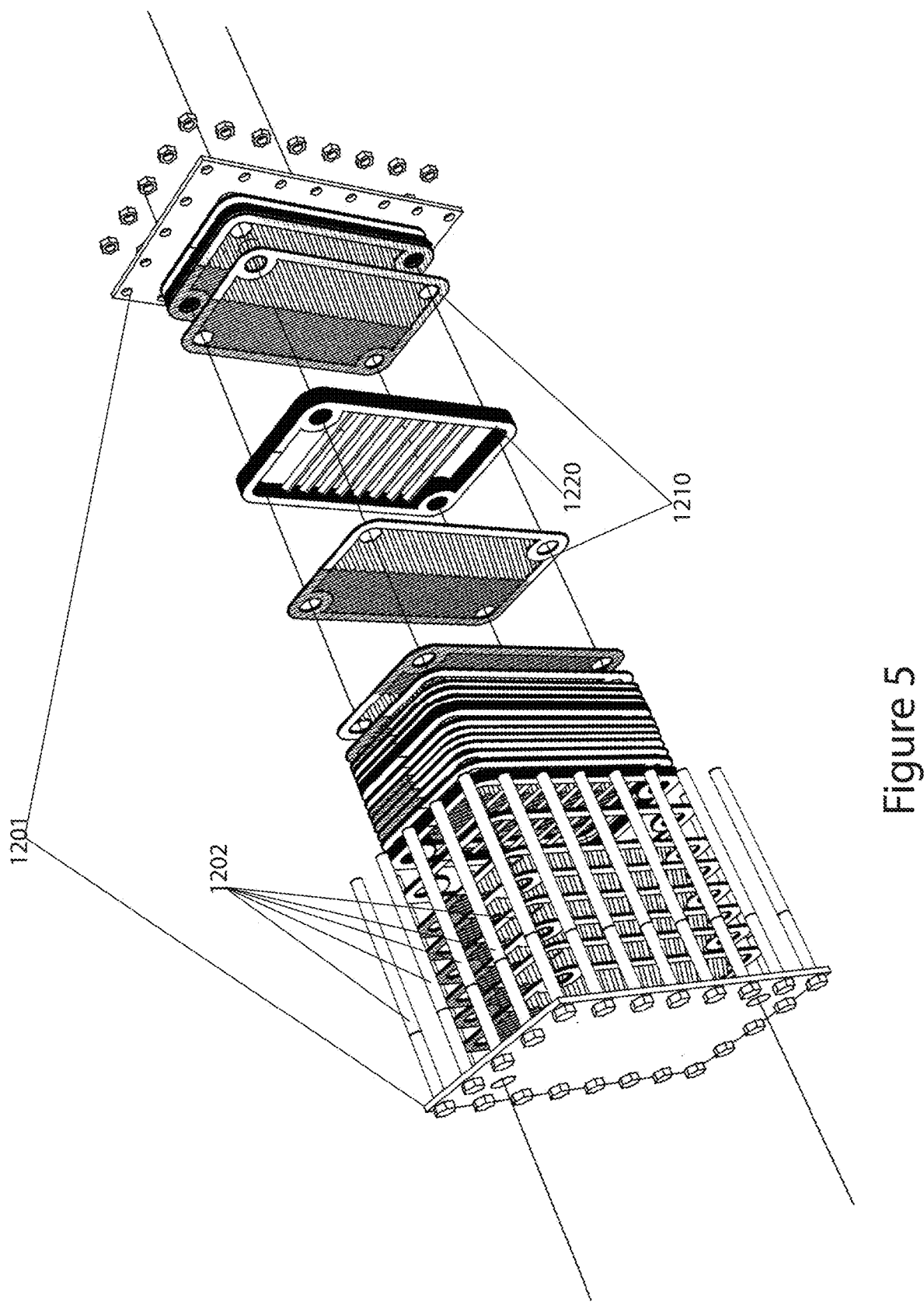
FIG. 5 shows further details of the continuous-flow biodiesel reactor from FIG. 2, illustrating exemplary assembly of the reactor, illustrating how the contact plates, the spacers and the static plate mixers, are stacked on sliding rails and confined by two end plates. Sealing gaskets and spacers are not shown in the figure.
Figure 6:
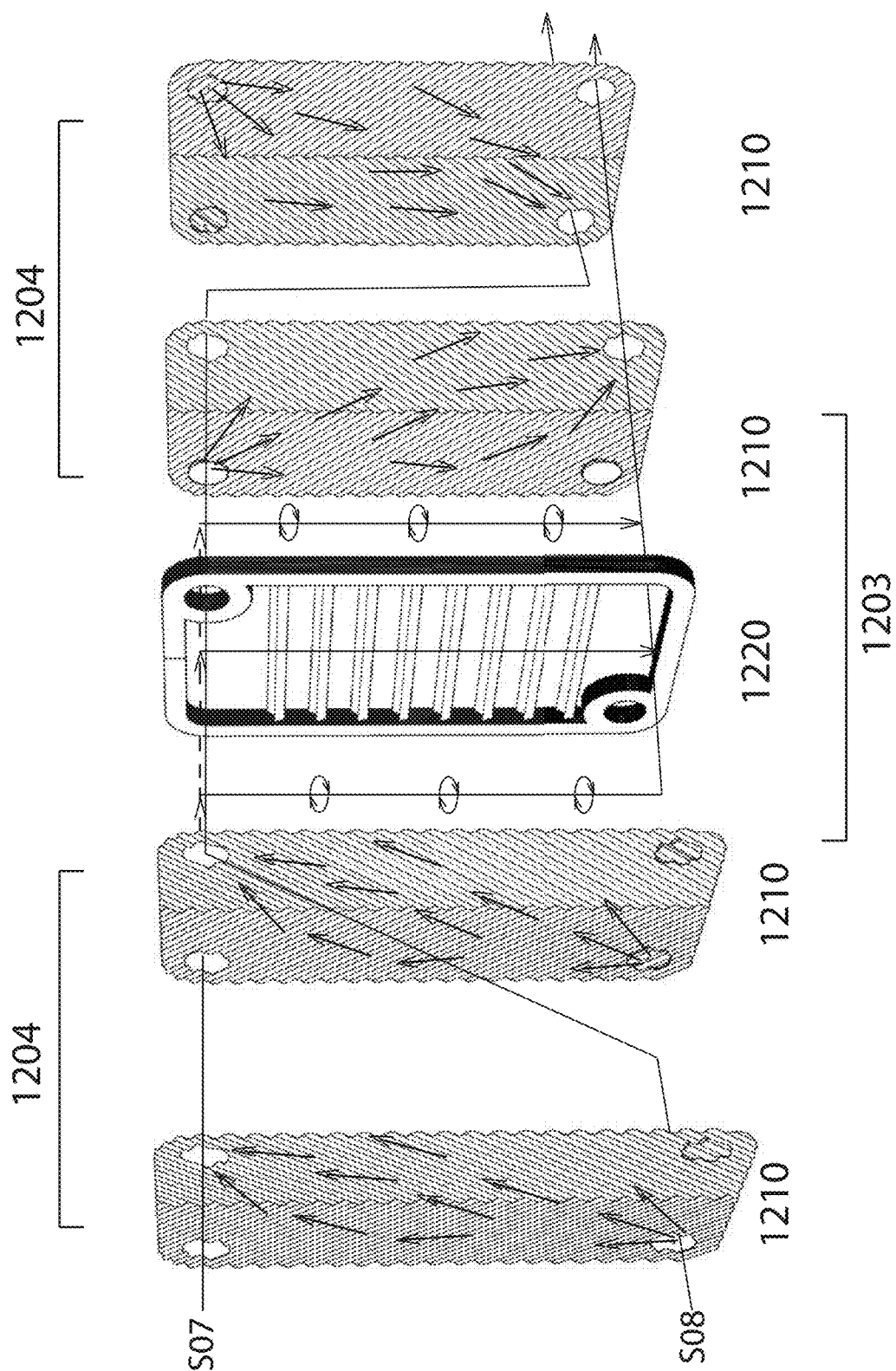
FIG. 6 shows an example of a section of the continuous flow biodiesel reactor illustrating the reactants and thermal media flow through the reactor in a parallel-flow configuration.

In FIG. 3, main components of the continuous-flow biodiesel reactor (1200) are shown in one exemplary embodiment. These are the contact plates (1210), the static mixer plates (1220), the spacers (1230) and the sealing gaskets (1240) provide sealing between the individual components. In a preferred embodiment, an example of which is shown in FIG. 4, these components are stacked in a succession of a contact plate (1210), a spacer (1230), a static mixer (1220), a second spacer (1230) a second contact plate (1210), a spacer (1230) and a third contact plate (1210). In this figure, spacers (1230) are shown between individual components, but gaskets (1240) are not shown. In the example of a stack build in this embodiment, one flow cell of the continuous flow biodiesel reactor is provided with contact plates with the static mixer plate in between providing a reaction (conversion) channel and the adjacent contact plates a channel for thermal media, the distance between the contact plates and the contact plates and the static plate mixer, being adjusted by providing spacers having an appropriate width. The alternating contact plates and spacers and static plate mixers are stacked in the appropriate order on lateral tracks (not shown) along with the sealing gaskets and compacted by rigid end-plates (1201) on independent sliders (1202). This is exemplary shown in FIG. 5 (spacers and gaskets not shown in this view). The confinement between the end plates (1201) allows for high lateral operation pressure that is only limited by the specifications of the end plates. In a preferred embodiment, illustrated in FIG. 6, the reaction channels of the continuous flow biodiesel reactor (the conversion cells) (1203), are connected in series to allow continuous flow (S07) through the reaction zone. The alternating channels, the thermal cells (1204) are also connected in series to provide a flow path or channel (S08) for heating media to effectively provide heat to the reactants. These flow regimes may also be in a counter flow configuration, depending on the desirable heat gradient.

In this embodiment a plurality of such flow cells compose the continuous flow biodiesel reactor and material flow is directed through the reactor such that reactant media flows between the contact plates, that bracket a static plate mixers, and build the reaction flow path or channel (S07), while thermal media, for control of the reaction temperature, flows in the alternate channel (S08) between the two contact plates that are not separated by a static plate mixer. Thereby, thermal control of the reaction media is achieved by the circulating thermal media (e.g., steam, oil) in the separate thermal channel.

It will be appreciated that spacers and/or mixers (e.g., static mixers) in the system can be coated with a suitable catalyst.

Contact plates, mixers and/or spacers can advantageously also be mechanically roughened, when so desired. Alternatively, or additionally, other means for roughening surfaces that are known in the art can be used to roughen selected surfaces or components, such as plates, mixers and/or spacers.

Alternatively, the heating section can be split into two or more heating zones, where separate zones may be heated with different media, e.g., oil and steam. Such separation may also serve to minimize heat gradient by parallel injection of e.g., the same heating media into different zones of the reactor system. Similarly, the reaction zone may be stacked to provide different sections with distinctly different reaction conditions. For biodiesel production these may e.g., constitute a first section where catalysis is primarily tailored for free fatty acid esterification and a second section where catalysis is primarily tailored for trans esterification of the glyceride fraction of the feed. These may e.g. be acidic and basic, immobilized solid-state catalysts respectively or different enzymatic catalysts, as discussed in detail herein below. Where advantageous these sections may further be separated by ion exchanging sections or dehydration sections, where the dehydration or ion exchanging material is immobilized on the surfaces of the respective, stackable plates and may be regenerated through heat, solvents and/or chemical treatment without dismounting the reactor. This may be of particular advantage where the activity of an immobilized solid-state catalyst is boosted by parallel injection of a homogeneous catalyst or media for maintaining the activity of said solid-state catalyst. An example where such media may be advantageous is the use of sulphated zirconium oxide or other sulphated metal oxides. Here a co-injected sulphuric acid may at the same time serve as a homogeneous catalyst and serve to maintain the activity of the immobilized catalyst. Similar situation may apply with respect to co-injection of alkaline hydroxides or other basic media where basic solid-state catalysts are applied.

Alternatively, the reactor may be divided into sections where it is advantageous to run esterification of the free fatty acids and transesterification of the glyceride fraction separately. In such configurations one or both sections may be run with homogeneous catalysts with adequate purification/conditioning as intermediate steps. These may include but are not limited to flash evaporation, dehydration or ion exchange and may be realized with a continuous separation, wet and dry washing and purification in one column as described in detail herein below. Accordingly, in some embodiments the biodiesel reactor comprises at least two serially connected reactors or reactor sections. In one such embodiment esterification with homogeneous acid catalyst is effectuated in the first reactor/reactor-section and transesterification with homogeneous basic catalyst is effectuated in the second.

In embodiments described here above and forth herein below, the reactant feed (S01) is preferably supplied from the pre-mixer (1100) to the continuous flow biodiesel reactor (1200) with a high-pressure liquid pump (1205a), preferably air driven, placed after the static pre-mixer (1100). Pressure is controlled through a backpressure regulator at the exit port of the reactants conversion path (1205b). Similarly, the thermal liquid is supplied with a high-pressure liquid pump (1206a), preferably air driven, and the pressure is controlled through a backpressure regulator at the exit port of the thermal media path (1206b). The pressure build up in the thermal section and in the conversion section during start-up, its maintenance and its reduction when operation is halted, is actively synchronized with readings from both back pressure regulators (1205b and 1206b) being supplied (DS01b and DS02b) to a control unit (1207) synchronizing the high-pressure pumps for the thermal media and the reactant feed (DS01a and DS02a to 1205a and 1206a).

The term "contact plates" as used herein indicates that the plates come in contact with the introduced reactants, at least on one side. The contact plates are in some embodiments corrugated, to increase surface area and improve flow dynamics and contact. Preferably one or both sides of the contact plates are coated with immobilized catalytic material depending on the flow configuration as discussed in more detail herein below.

Preferably a plurality of static mixers are arranged in between contact plates in the continuous flow biodiesel reactor, but in some embodiments the reactor may be realized without static plate mixers if sufficient flow is provided by the spacing of the contact plates and effective mixing is provided through sufficient uproar of the reaction media at the surfaces of the respective contact plates. Any combinations of reaction cells with and without static mixers between the contact plates may also be realised where advantageous. The static plate mixers, where applied, can be but are not limited to vertically extending profile members, such as V-shaped profiles, curved profiles, bars, meshes or the like.

Preferably a flash evaporation drum (2000) is placed between the continuous flow biodiesel unit (1000) and the separation and wet and dry washing column (3000), specifically where surplus alcohol is used to increase reaction yield. Where the reaction, however, is carried out under close to stoichiometric conditions such flash evaporation drum may be omitted and the raw product from the continuous flow biodiesel reactor may be fed directly into the continuous separation and wet and dry washing and purification section. Flash evaporation drums are as such known in the art, and the skilled person can select a suitable arrangement. The flash evaporation drum in the current embodiment is typically operated at ambient pressure but may be operated at reduced pressure. The raw product from the continuous flow biodiesel reactor (S02) typically contains surplus alcohol, and water along with a significant glycerol fraction and eventually remaining catalyst and other less significant impurities. The pressure drop when the hot raw product enters the flash evaporation drum effectuates flash evaporation of the bulk of the methanol and partly of the water, depending on the temperature of the raw product and other conditions. The alcohol and water is preferably condensed in a heat-exchanging condenser allowing for recovery and re-use of the surplus methanol (S03) and partially of the heat of condensation released in the process. The low vapour pressure fraction mainly containing the biodiesel product and glycerol, where glycerides have been converted, accumulate at the bottom of the flash evaporation drum and are actively transferred to the continuous separation and wet and dry washing and purification section (S04 to 3000).

Figure 7:
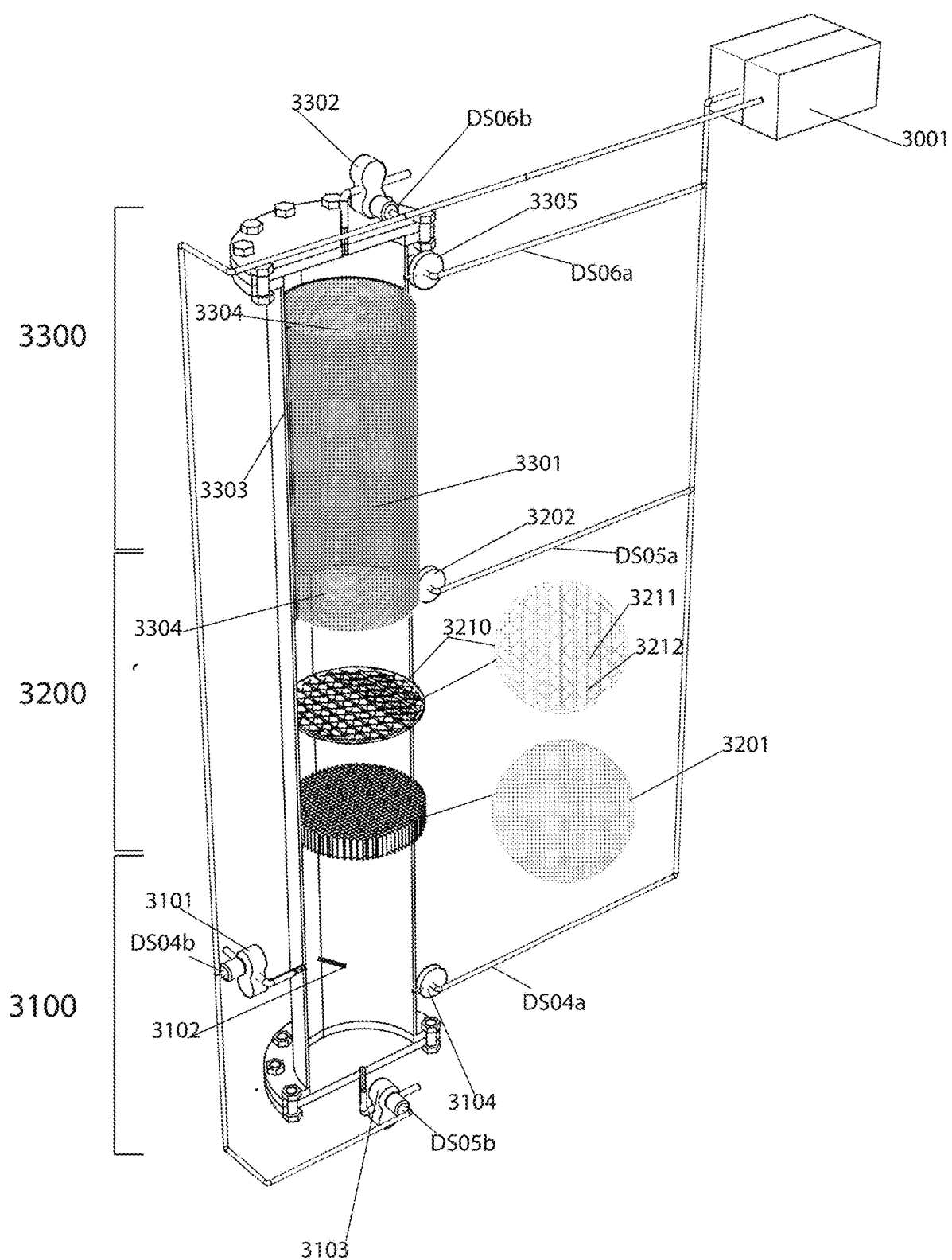
FIG. 7 shows an exploded view of the continuous-flow separation and wet and dry washing and purification column of the invention.

In a preferred embodiment, the continuous separation and wet and dry washing and purification section (3000) is shown exemplary in FIG. 7. The column consists of three primary functions; (i) separation by settling, which takes place in settlement section (3100). (ii) water-wash, which takes place in the wet-wash section (3200) and a final dry wash and purification, which takes place in the packed top section (3300). In this embodiment, unwashed biodiesel is actively fed to the lower third of the column, the settlement section (3100). The Glycerol-phase (G-phase), also containing water and some other polar components, separates from the biodiesel through gravitational sedimentation while the biodiesel phase rises upwards in the column driven by its lower density and the pressure drop upwards the column. In the middle third of the column, the wet-wash section (3200), water, washing is realized through a suitable arrangement of water injection nozzles (3210) emerged in the rising biodiesel section of the column. The nozzle arrangement (3310), exemplary described in more detail herein below, provides for an even dispersed water stratum, continuously forming at around the middle section of the column and migrating downwards. The evenly dispersed water, migrating downwards, is continuously in contact with the pre-separated biodiesel rising from the section below, providing for effective wet (water) wash of the biodiesel before the wash water and washed out impurities settle with the G-phase at the bottom of the column. Leftover methanol, dissolved particles, and other polar impurities are to a large extent removed in the wet washing section. In a preferred embodiment the water dispersion system (3210) is separated from the settlement region and feed port by a grid-mesh (3201) (to promote laminar flow and reducing turbulence in the settlement section (3100), potentially induced by the water injection system. The top third of the column is the dry-wash, or purification section (3300). The separated and pre-wet-washed biodiesel migrates upwards in this section through a bed of ion exchange resins or combination of suitable resins (3301). The ion exchange resins extract all remaining unwanted particles and impurities for the biodiesel to preferably pass all standards requirements without further purification.

Figure 8:
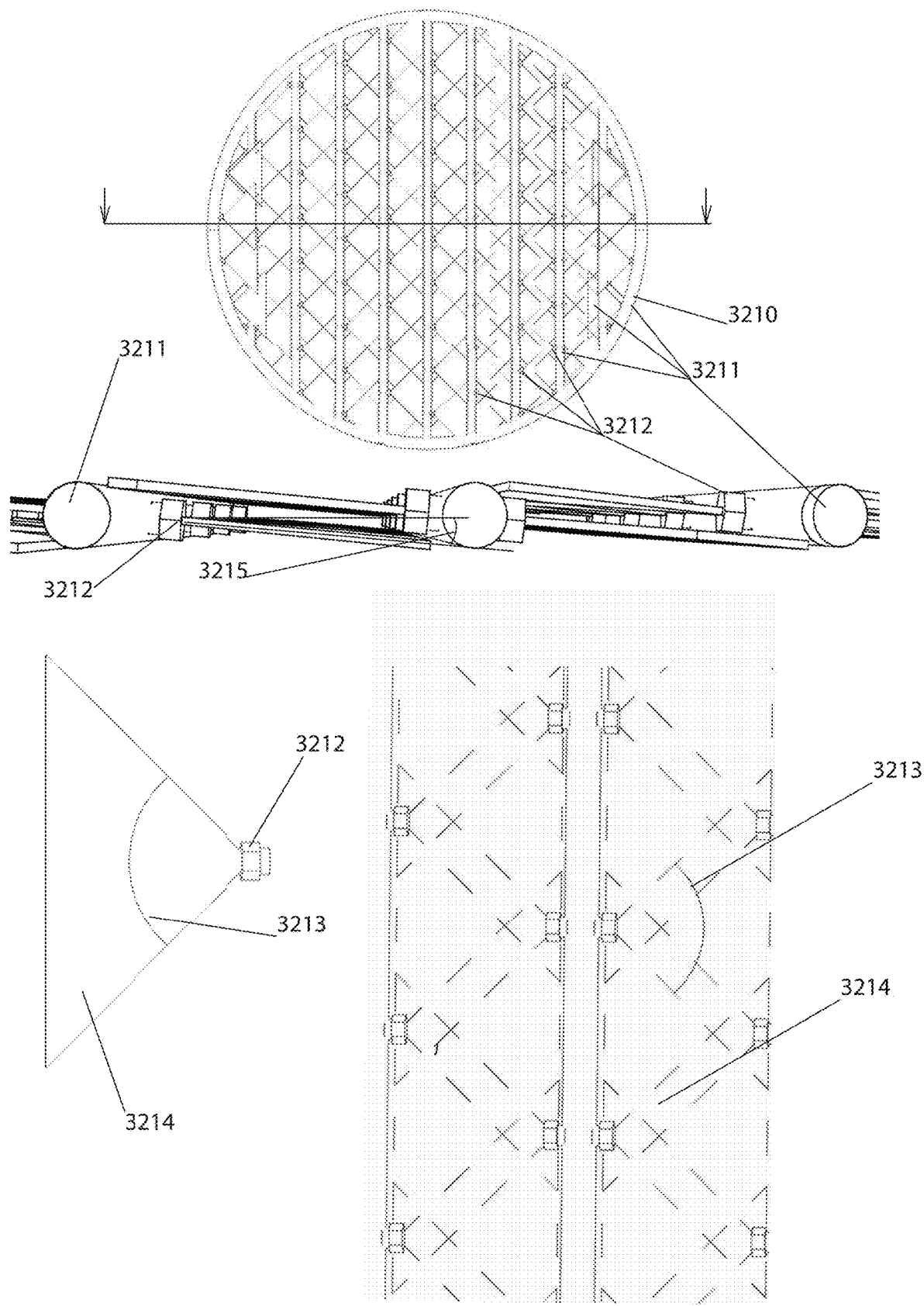
FIG. 8 shows a top view and cross-section of a section of the water spraying armature of the wet and dry washing and purification column, exemplary illustrating a possible nozzle arrangement and spraying fields for a spray angle of about 45°.

In a preferred embodiment outlined as an example here below, the diameter of the separation and wet and dry washing column (3000, FIG. 7) is 3/20 of its height. The separation section (3100) is defined by design as the lowest, about 1/3 of the column, the wet-washing section (3200) as the middle, about 1/3 of the column and the purification section (3300) as the top, about 1/3 section of the column. In the current embodiment unwashed biodiesel is pumped from the flash evaporation unit (2000) preferably with an air driven pump (3101) and enters the separation section (3100) through a feed pipe (3102). The biodiesel rises in the column driven by its lower density and the differential pressure along the column and separates from the high-density glycerol phase through its sedimentation. The feed pipe (3102) pierces preferably 1/3 of the column width diagonal towards its centre and is preferably placed 1/5 of the column height from the bottom. Alternatively, the feed may be supplied through a plurality of pipes arranged in any suitable manner or through internal dispensers preferably arranged on a circular pipe with a diameter that is about 2/3 of the column inner diameter, or through other suitable means. The settled glycerol phase is pumped of from the bottom of the column or close to the bottom of the column preferably with an air driven pump or any other suitable pump (3103). The feed is preferably in the range of 40-60° C. and temperature control is achieved through a heat exchanger placed before or after the feed-pump (not shown). Conductivity sensor (3104) is placed above the bottom of the column, preferably 1/10 of its height measured from the bottom. The signal (DS04*a*) from the conductivity meter (3104) is fed to a PID control unit (3001) controlling the feed pump (3101), the draining pump at the bottom (3103) and the biodiesel drain pump at the top of the column (3302) through the respective data streams (DS04*b*, DS05*b* and DS06*b*). This serves to optimize the separation in the settlement region. A temperature sensor (not shown) is preferably suitably positioned to monitor the feed temperature and the temperature readout is fed to the PID control unit (3001) which also actively controls the feed temperature to provide an additional parameter to optimize the separation in the sediment region and minimize the retention time within the column. For a feed flow rate of 250 l/h within a column of 2 m height a 33 minute retention time is provided. The sedimentation section of the column (3100) is preferably hollow but can alternatively have baffles, be divided into smaller sections or contain packing materials including all random bed and structured packing materials, where such arrangements promote the separation. The wet wash section (3200) is defined as the second third of the column. It is equipped with a spraying armature (3210) composed of a grid of pipes (3211) with a plurality of water spray nozzles (3212) arranged on said pipes. The grid is preferably emerged in the rising biodiesel 9/20 of the height of the column above its bottom. The spray nozzles (3212) are preferably flat fan nozzles with even distribution and a 40-60° fan angle (3213). Spacing of opposite and neighbouring nozzles is optimized to eliminate blind spots in the spraying profile (3214). In this arrangement, the nozzles (3212) are designer and arranged in such way that the spray field between two nozzles placed as next neighbours on one pipe is covered by the spray field (3214) of the facing nozzles on the next parallel pipe. In a preferred embodiment the nozzles are tilted horizontally, preferably alternating +1 to +3° and −1 to −3° spraying angle (3215) to avoid spray interference causing disrupting water aggregation to larger droplets and disruption of the sprayed water layer, and to assure for water coverage below the respective pipes. Alternatively, opposite nozzles are offset with respect to each other by a distance given by the horizontal dispersion over the spraying distance and the pipe diameter. These arrangements are shown schematically in FIG. 8 for horizontally tilted nozzles, but any other arrangement of said nozzles may be realized where advantageous. In this preferred embodiment the water flow through the nozzles is fixed to a flow rate of 1/10 of the volume of the feed stream and the injected water is preferably maintained at temperatures higher than 50° C. but lower than 100° C. Where advantageous, other flow rates and temperatures may apply. A conductivity sensor (3202) is inserted into the column above the spray grid (3210), half way between the spray grid and the dry wash section. The conductivity sensors (3202) provides signal (DS05*a*) to the central PID control unit (3001) to synchronize the feed and draining pumps. The wet washing section (3200) is preferably separated from the separation section by stainless steel gratings or gratings of other material (3201). The gratings serve to reduce turbulence and assure for laminar flow in in the settlement region and are preferably such that the height of the grid is at least 5 times that of the channel width. The channels are preferably square, but may be circular or of any suitable form. The gratings are preferably placed 1/3 of the length of the column, measured from the bottom. Where beneficiary, a plurality of gratings may apply and may be placed as advantageous below the spraying nozzles. The top third of the column constitutes per definition the dry wash or purification section (3300), where the pre water-washed biodiesel rises through a section packed with purification and/or drying resins or gels as appropriate (3301). The packing material is confined in a cylinder (3303) constricted by a suitable mesh at its top and bottom (3304) allowing for dispersion of the biodiesel through the packing material, but restricting the packing material to said cylinder. The cylinder rests on profiles inside the column and is of a tight fit diameter not allowing flow between its outer walls and the inner walls of the column. The position of the seat is preferably ⅔ of the total height of the column measured from bottom up. And the cylinder height, the packed section of the column, is in this embodiment about ⅓ of the column height. Where preferable the column may be extended to provide a void section above the packing material as shown in FIG. 7 or the purification section may be less than ⅓ of the column height. For replacement or regeneration of the packing material the cylinder can be conveniently removed through the upper opening of the column. Where beneficiary different resins and/or gels may be packed in separate cylinders stacked above each other. The purification section is provided with a conductivity sensor (3305) close to its top providing signal (DS06a) to the central PID control unit (3001) to further synchronize the feed and draining pumps. The washed and purified biodiesel is removed from the top of the column with a suitable pump (3302) synchronized through the central PID (3001) with the feed pump (3101) and the drainage pump at the bottom of the column (3103).

In principle the current biodiesel production system is suitable for use with homogenous or heterogeneous catalysts or alternatively for conversion without a catalyst. In some embodiments at least one homogeneous catalyst is applied, which can be but is not limited to an acidic catalyst, such a sulphuric acid, or an alkali catalyst such as but not limited to sodium hydroxide, sodium methoxide or potassium hydroxide or potassium methoxide. Conventional homogeneous alkaline catalyst however is not applicable to raw materials comprising a substantial amount of free fatty acids. Accordingly, in some embodiments at least one heterogeneous catalyst is applied, which can be an organic or inorganic catalyst, such as are known in the art or enzymatic catalyst. In some embodiments such as further described herein above, a combination of catalysts is used in separate reactors or separate reactor sections, wherein a first catalyst catalyses esterification of free fatty acids and a second catalyst catalyses transesterification of glycerides in a second section. Where combination of catalysts is used in separate reactors, intermediate purification through flash evaporation or resins may be introduced between the reactors.

Intermediate resin purification may also be introduced where a single catalyst or combination of catalysts is used in a single reactor arrangement.

Figure 9:
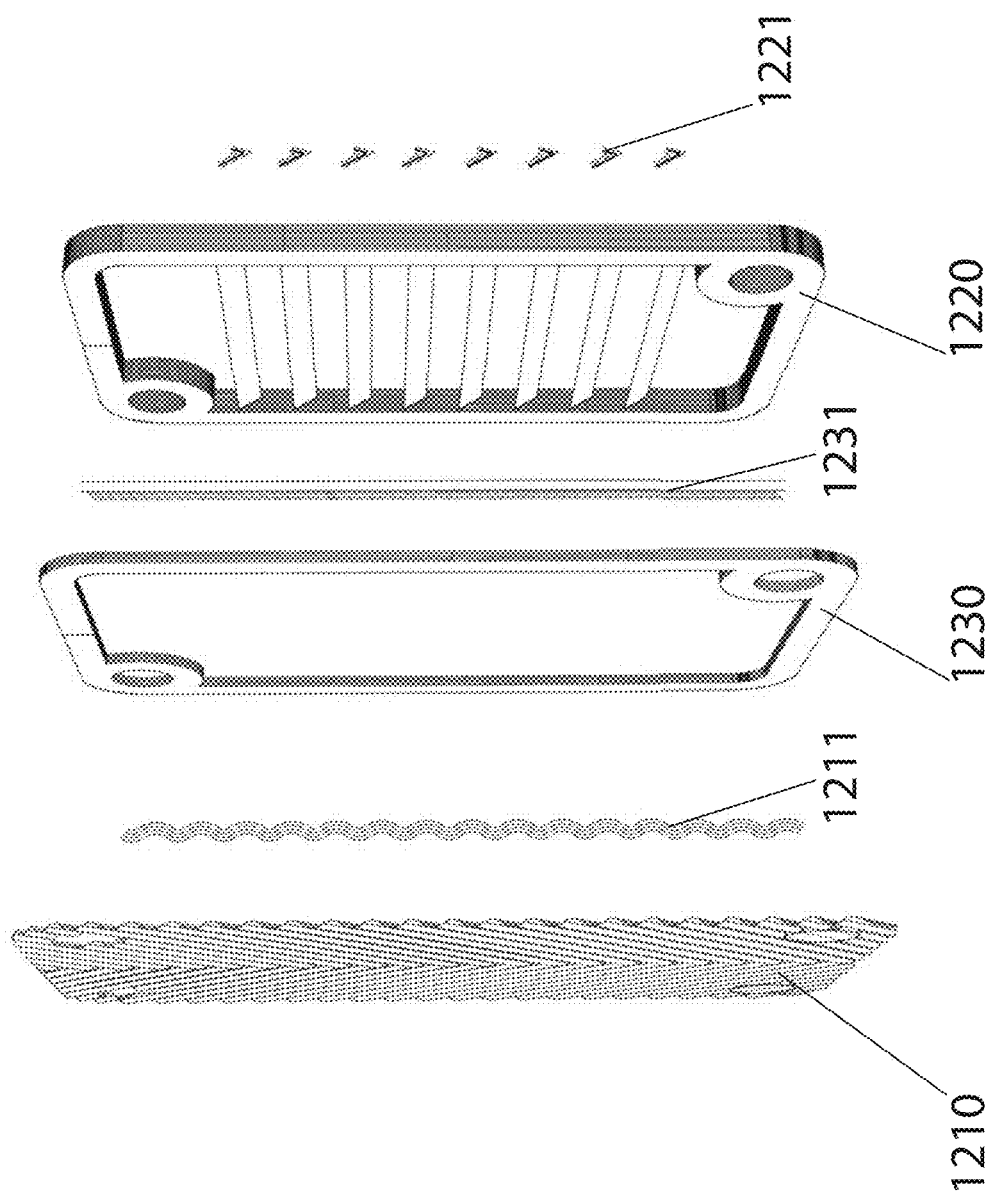
FIG. 9 shows further details of a continuous-flow biodiesel reactor as illustrated in FIG. 2, illustrating surface coating in an expanded cross-section of a contact plate, a static mixer and a spacer.

Esterification and transesterification catalysts are as such known in the art, and a suitable catalyst can be selected by the skilled person. The catalyst is in some embodiments a solid-state catalyst or can in other embodiments be an enzyme catalyst, which may or may not be immobilized on a solid substrate. Where immobilized catalyst is used the contact plates, the plate mixers and the spacers may be coated with the respective catalyst, and preferably have flow perturbing surface, to enhance turbulent flow and efficient mixing. Such arrangements are exampled in FIG. 9 showing a cross section through a coated contact plate (1210, 1211) and coated static mixer plate (1220, 1221) and a coated spacer (1230, 1231).

In some embodiments contact plates in the reactor are arranged with catalyst on one side and the plates being arranged such that the coated sides face each other, alternatively separated by a static plate mixer, and material flow is directed through the reactor such that reactant media flows between the catalyst-coated sides and thermal media flows in the channels between non-coated sides.

To generate the catalytic surface where a solid state catalyst is preferable, the surfaces confining the reaction channel of the continuous-flow biodiesel reactor may be coated in one or more steps, by e.g., precipitation and calcination, thermal spray coating, chemical vapour deposition, reactive coating, atomic layer deposition or any other coating method or combination of these, providing a rough, high surface-area coating protruding from the surfaces.

Where applicable, metal sponges (e.g., titanium or zirconium) or porous structures may be directly grown on the surface or brought on to the surface from powders of the respective metals.

Doping, where advantageous, may be achieved in the same step or through e.g. chemical vapour deposition. Controlled oxidation may then proceed thermally assisted, or non-thermally-assisted, through exposure to the appropriate oxidizing media in gaseous or liquid form, e.g., air, oxygen, oxidative solutions of metal salts or oxides. Direct coating with oxides may also be achieved through direct precipitation on the native or pre-treated surface and consecutive calcination.

The coating provides at the same time for the desired catalytic activity and efficient microscopic mixing at the high share surface.

Where enzymatic catalysis is applied, immobilization is preferably achieved through covalent bonding to an inorganic substrate with large surface areas such as silica or aluminium oxide, but may also be achieved through physisorption or encapsulation and where advantageous the substrate may be organic material such as e.g., starch or collagen.

Where immobilized solid-state catalyst is used, the contact plates (1210) are in general coated on one side with the respective catalyst (1211) providing a catalytic surface layer, preferably enzymes, for catalytic conversion of free fatty acids and/or transesterification of glycerides. The contact plates are in this embodiment preferably stacked with alternating two coated surfaces facing each other and two non-coated surfaces facing each other, providing the reaction channel and the channel for the thermal media respectively. Any other sequence of stacking and coating is optional if advantageous. Thermal media may be but is not limited to steam, oil, water, coolant etc.

In some embodiments, the biodiesel reactor unit comprises at least two reactors, wherein each reactor comprises non-coated contact plates, spacers and static mixers, whereby esterification with a homogeneous acid catalyst is effectuated in the first reactor and transesterification with a homogeneous basic catalyst is effectuated in the second reactor.

Where the spacing between contact plates is adjustable through spacers (1230), these may also be coated with flow disrupting inner surfaces for enhancing turbulent flow and efficient mixing at the verge of the reactors flow regime (1231). Preferably the inner surfaces of the spacers are also coated with the appropriate solid state or enzymatic catalyst (1231). Where static plate mixers are installed and immobilised solid-state catalysts are used, the static plate mixers are preferably coated with the same catalyst as the contact plates (1221). Thus such static mixers increase the extent of the catalytic surface, allow for better control of the macroscopic flow through the reactor and provide effective mixing and exchanging of material at all catalytic surfaces.

Figure 10A:
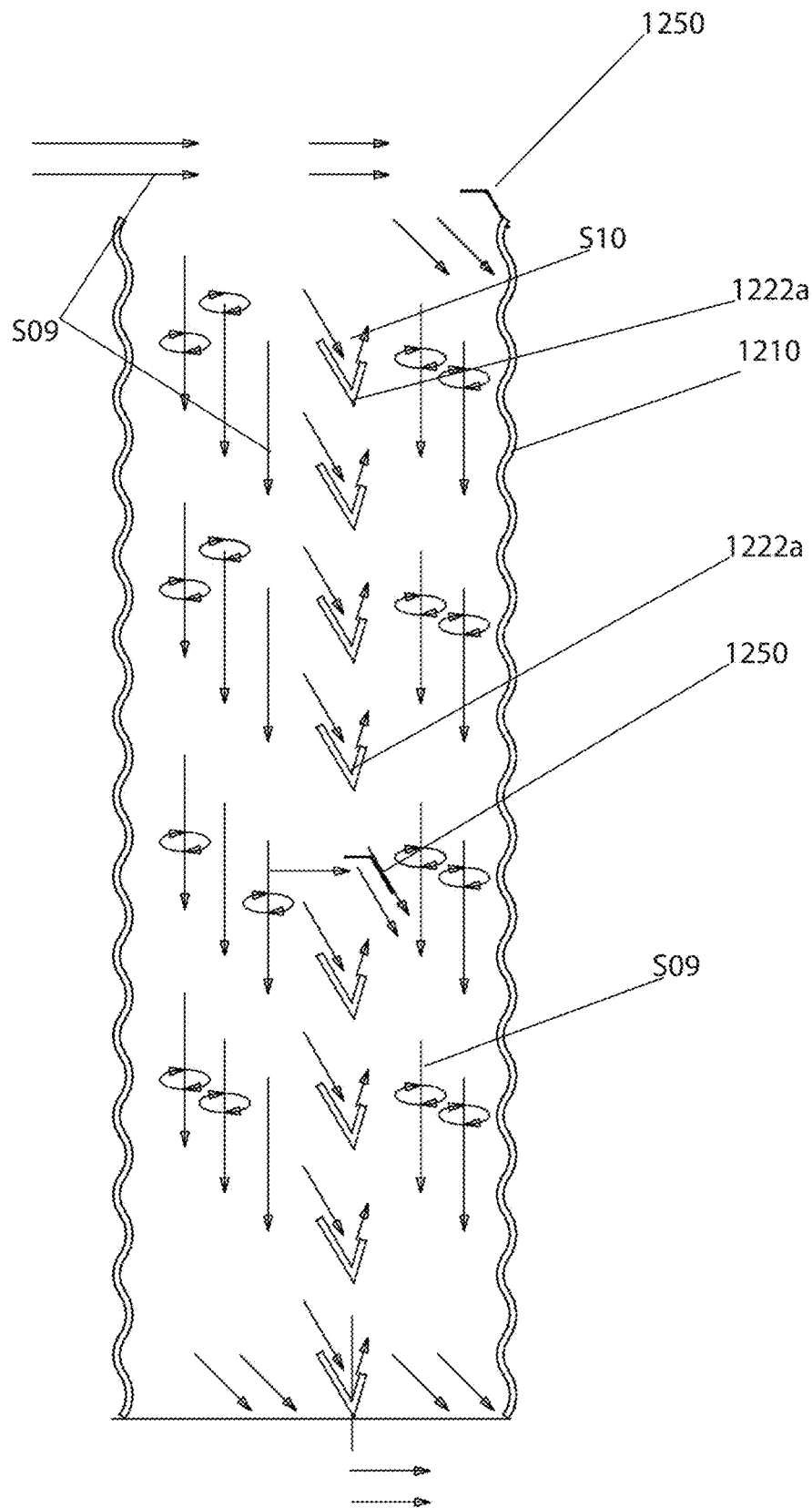
FIGS. 10a and b show an expanded cross-section example of flow lines within one cell of the continuous-flow biodiesel reactor composed of a static mixer confined by two reactor plates. Two flow restricting slits are shown in the figures and the cross section is shown for two different realization of the mixers, a and b. The cell is shown without spacers.
Figure 10B:
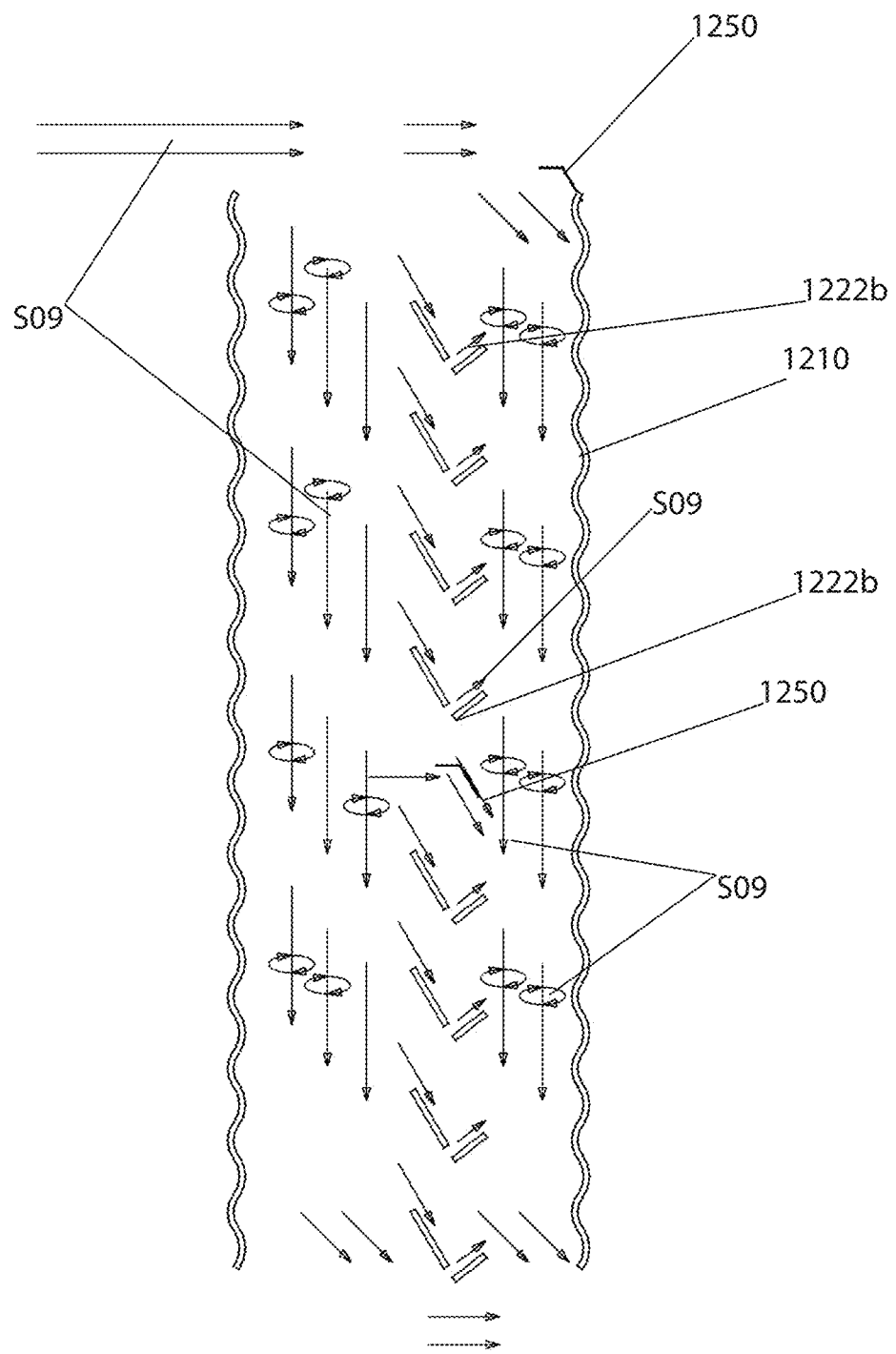

In a preferred embodiment of the invention, the arrangement of the static-mixers plates (1220), between two contact plates (1210) in the continuous flow biodiesel reactor (1200) is such that net reactant flow from one side of the mixer plate to the other side is promoted through differential pressure on the respective sides of the plate mixer. The net flow through the static plate mixer between the contact plates is in this embodiment directed counter current, with respect to the net flow through the respective reactor cell. Exemplary arrangement, along with the respective flow lines (S09) are shown in FIGS. 10a and b with static mixers realization through angled, counter flow slits terminated with shorter counter flow fins at the exit side. In FIG. 10a the angled counter flow fins are directly in continuation of the (left-hand side) angled, flow directing slits and fowling may be prevented through adequate drainage at the onset of the counter flow fins (not shown). In FIG. 10b the counter flow fins are detached and offset with respect to the (left-hand side) angled, flow directing slits.

In this example partial flow is directed through the static mixer by its realization through angled, flow directing slits terminated with the shorter counter flow fins (1222a and 1222b) at the exit side of the mixers providing for counter-flow (S10) of the reactant mixture with respect to the principal flow direction through the reactor (S09). Net reactant flow through the static mixers is ensured by a pressure drop across these provided by flow restricting elements (1250) and/or by offsetting the static mixer plates with respect to the centre between the bracketing contact plates. Examples of this constellation providing two restricted flow paths or channels along the principal flow direction are provided in FIGS. 10a and b.

Microscopic turbulence and effective material exchange at the surface of the static mixers, the contact plates and the spacers are further effectuated through chemical or mechanical roughening of said surfaces and/or through appropriate coting techniques, for example where these are coated with catalytically active material as described in more detail herein above. Specifically, turbulent flow and material exchange is promoted at the fringes of said static mixers through the counter flow of the reactant streams meeting at these, and through surface roughening of the respective edges. Further uproar of the flow may be promoted through bulging and roughening of the edges.

For high- or ultra-high-pressure applications, exceeding the transversal tolerance of the gaskets, the continuous flow biodiesel reactor may be encapsulated in a differential pressure equalizer (1260) as shown in FIG. 2. The differential pressure equalizer (1260) encompasses a high-pressure sealed casing and serves primarily to reduce the transversal pressure strain on the reactors gaskets. The inlet and exit ports of the reactor (reactants and thermal fluids) extend outside the casing though a high-pressure, preferably tubular sealing (1261).

In operation within the differential pressure equalizer, the casing is maintained at a pressure comparable or slightly lower than the operation pressure of the reactor, assuring for low differential pressure. Preferably synchronization of the reactant pressure, the thermal media pressure and the casing pressure is achieved and maintained with air driven, high-pressure or ultra-high-pressure liquid pumps (1262), and a relief mechanism with a pressure gauge (1263). The pressurization liquid is preferably fatty acid methyl esters produced in the process or with comparable chain length to that of the produced biodiesel, but may also be other media, preferably inert and of low compressibility.

The pressure in the pressure equalizers is actively adjusted to that of the thermal section and the conversion section with readings from the back pressure regulators (1205b, 1206b) and pressure the gauge (1263) at the high-pressure casing being supplied to a control unit (DS01b and DS02b and DS03b to 1207) synchronizing the high-pressure pumps and the back pressure regulators for the high-pressure equalizer, the thermal media and the reactant feed (DS01a, DS02a and DS03a to 1205a, 1206a and 1262).

EMBODIMENTS

Exemplary embodiments of the invention are set forth in the following clauses.

1. A continuous flow biodiesel production and purification system comprising a tandem arrangement comprising at least one continuous flow modular biodiesel reactor unit and at least one continuous flow separation and purification unit, preferably wherein the at least one continuous flow separation and purification unit is provided as at least one continuous flow separation, wet washing and purification unit in one column.
2. The system according to the previous clause, comprising a continuous flow modular biodiesel reactor and a continuous flow separation and purification unit that is adapted to receive and purify a stream of biodiesel from the biodiesel reactor.
3. The system according to any one of the preceding clauses, wherein the biodiesel reactor unit comprises a continuous flow biodiesel reactor, adapted to receive a continuous stream of fat and/or oil, reacting that stream with at least one alcohol such as methanol, ethanol or propanol to generate a continuous flow of biodiesel.
4. The system according to any one of the previous clauses, wherein the biodiesel reactor comprises a plurality of contact plates coated with at least one esterification and/or transesterification catalyst for catalyzing esterification of free fatty acids and or transesterification of glycerides, preferably so that alternating coated sides face each other and two non-coated face each other such that reactants flow between the coated sides of the contact plates along a reactant channel while thermal media for temperature control of the reactants flows along a thermal media channel between the non-coated sides of the contact plates.
5. The system according to any one of the previous two clauses, further comprising one or more spacers and/or static mixers for adjusting the spacing between the contact plates and enhancing turbulent mixing, respectively, preferably so that a static mixer, when provided, is placed between the coated sides of two contact plates that face each other and thereby provide the reactant channel.
6. The system according to any one of the previous three clauses, wherein the reactant channel is configured such that reactants can flow through two adjacent contact plates that are provided with at least one static mixer between them, and wherein the thermal media channel is provided by flow through two contact plates of which one provides the boundary to the reactant conversion channel as to allow for thermal transfer between a thermal channel and an adjacent reactant channel.
7. The system according to any one of the previous three clauses, wherein the distance between adjacently arranged contact plates and/or static mixers is adjusted by means of at least one intermediate spacer.

8. The system according to any one of the previous five clauses, wherein the biodiesel reactor comprises a pre-mixing inlet system for allowing mixing of reactants prior to and/or during their delivery into the reactor.

9. The system according to the previous clause, wherein the pre-mixing inlet system further comprises means for delivering a homogeneous catalyst and/or at least one co-solvent or reagent.

10. The system according to any one of the previous six clauses, wherein the biodiesel reactor comprises a plurality of contact plates coated on at least one side with an esterification and/or transesterification catalyst, and wherein adjacent contact plates are preferably separated by spacers.

11. The system according to the previous clause, wherein the continuous-flow biodiesel reactor comprises a plurality of contact plates coated on one side with an esterification and/or transesterification catalyst, and wherein alternating coated sides face each other and two non-coated face each other such that reactants flow between the coated sides of the contact plates while thermal media for temperature control of the reactants flows between the non-coated sides of the contact plates.

12. The system according to the previous clause, wherein a static mixer is placed between the coated sides of two contact plates that face each other and constitute the reactant path . . . .

13. The system according to any one of the previous clauses 3-11, wherein the continuous flow biodiesel reactor comprises a plurality of sections, in sequential the order:
   a. a first contact plate assembly comprising at least two contact plates, optionally coated on one side with at least one catalyst,
   b. at least one static mixer,
   c. a contact plate, optionally coated on one side with at least one catalyst,
wherein the first contact plate assembly provides a thermal media channel, through which thermal media flows to provide heat transfer to a reaction zone and wherein at least one static mixer and at lest two contact plate are adapted so as to provide a reactant conversion channel through a reaction zone, within which reactants react to provide esterified products.

14. The system according to the previous clause, wherein the reactant conversion channel is configured such that reactants can flow through two adjacent contact plates that are provided with at least one static mixer between them, and wherein the thermal media channel is provided by flow through two contact plates from which one provides the boundary to the reactant conversion channel as to allow for thermal transfer between a thermal channel and a reactant channel.

15. The system according to any one of the preceding clauses, wherein the distance between adjacent contact plates is adjusted by means of an intermediate spacer.

16. The system according to any one of the preceding clauses, wherein the distance between adjacently arranged contact plates and static mixer plates is adjusted by means of an intermediate spacer.

17. The system according to any one of the preceding clauses where the internal surface of said spacers is coated with a suitable catalyst.

18. The system according to any one of the preceding clauses where the surface of said static mixer plates is coated with a suitable catalyst.

19. The system according to any one of the preceding clauses where the surface of said contact plates is mechanically roughened or roughened by other means on at least on one side.

20. The system according to any one of the preceding clauses where the internal surface of said spacers is mechanically roughened or roughened by other means.

21. The system according to any one of the preceding clauses where the surface of said static mixer plates is mechanically roughened or roughened by other means.

22. The system according to any one of the preceding clauses, wherein said biodiesel reactor unit accommodates as input either or both of triglycerides and free fatty acids, wherein said unit comprises at least one catalyst that catalyses transesterification of glycerides and at least one catalyst that catalyses esterification of free fatty acids.

23. The system according to the previous clause, wherein said catalyst that catalyses esterification of free fatty acids is arranged in a first section and said catalyst that catalyses transesterification of glycerides is arranged in a second section of the unit.

24. The system according to clauses 14 or 15, wherein said continuous-flow biodiesel unit comprises at least two reactors, wherein each reactor comprises non-coated contact plates, spacers and static mixers, whereby esterification with a homogeneous acid catalyst is effectuated in the first reactor and transesterification with a homogeneous basic catalyst is effectuated in the second reactor.

25. The system according to any of clauses 12 to 16, wherein said contact plates are corrugated.

26. The system according to any of the previous clauses, further comprising at least one pre-mixer, for providing a feed of reactants into the continuous flow biodiesel reactor.

27. The system according to any one of the previous clauses, wherein the continuous-flow biodiesel reactor unit is enclosed within a differential pressure equalizing chamber enabling high-pressure operation of the reactor.

28. The system according to any one of the previous clauses, wherein the continuous flow separation and purification unit comprises at least one column that comprises a sequential assembly that includes at least one separation section, at least one wet washing section and at least one dry washing section.

29. The system of the previous clause, wherein the continuous flow separation and purification unit further comprises at least one feed pipe, through which untreated biodiesel is delivered into the unit, wherein the at least one feed pipe extends into the column, at an angle that is approximately 90° to a longitudinal axis along the column.

30. The system of the previous clause, wherein the at least one feed pipe extends into the column by a distance that is about 1/5 to about 2/5, preferably about 1/3, of the diameter of the column.

31. The system of any one of the previous two clauses, wherein the at least one feed pipe is provided at a height of about 1/5 of the column height.

32. The system of the previous clause, wherein the at least one wet washing section comprises a section that is adapted to receive an aqueous solution to wash biodiesel in the column.

33. The system of the previous clause, wherein the wet section comprises a grid of pipes comprising a plurality of vertical nozzles, preferably flat fan nozzles, for delivering a spray of water.

34. The system of the previous clause, wherein said nozzle arrangement is provided above (downstream from) the separation section, preferably at ⅓ to ⅔ of the column height, measured from its bottom (biodiesel entry point) so that, during use, the grid of pipes is immersed in rising biodiesel above the separation section 35. The system of the previous clause, wherein the grid of pipes is provided as a grid assembly in a plane that is approximately perpendicular to a longitudinal axis of the column.

36. The system of the previous clause two, wherein the grid assembly comprises a plurality of horizontal flat fan spray nozzles that are arranged at a fixed interval along the pipes, with rows of facing noses shifted with respect to each other by half the distance between neighboring nozzles and wherein the spray nozzles are adapted to provide a spray of water at an angle of about 40°-60°.

37. The system of the previous clause, wherein the plurality of nozzles are tilted horizontally, preferably at alternate angles of +1 to +3° and −1 to −3° respectively, for facing rows of nozzles to minimize spray interference.

38. The system of the clause 36, wherein rows of nozzles facing each other are offset vertically, preferably by slightly more than half the diameter of the pipes on which the nozzles are provided, to minimize spray interference.

39. The system of any one of the previous clauses 28-38, wherein the wet washing section and the separation section are separated by at least one grating, preferably a stainless steel grating.

40. The system of the previous clause, wherein the grating is provided at a height that is about ⅓ of the length of the column, with respect to the direction of flow in the column.

41. The system of any one of the previous clauses 28-40, wherein the dry section comprises at least one resin material for removing impurities, residual water and/or small particles from the biodiesel.

42. The system of the previous clause, wherein the dry section comprises a bed comprising at least one ion exchange resin.

43. The system of any one of the previous clauses 28-42, wherein the column has a cylindrical shape, and wherein the diameter of the column is in the range of 2/20 to 4/20 of its height, preferably about 3/20 of its height.

44. The system of any one of the previous clauses 28-43, wherein the column comprises a sequential arrangement of a separation section, followed by a wet washing section, which is in turn followed by a dry washing and purification section, and wherein each of the sections extends over approximately ⅓ of the height of the column.

45. The system of any one of the previous clauses 28-44, further comprising at least one heating unit, for controlling the temperature of reagent feed into the continuous flow separation and purification unit.

46. The system of the previous clause, wherein the heating unit is provided by a heat exchanger.

47. The system of any one of the previous clauses 28-46, further comprising at least one feeding pump, for feeding material into the column, at least one biodiesel pump, for extracting biodiesel from the top of the column and optionally at least one draining pump, for draining liquid from the bottom of the column.

48. The system of any one of the previous clauses 28-47, further comprising at least one temperature sensor and at least one conductivity meter, and at least one control unit that is adapted to receive signal from the temperature sensor and conductivity meter and upon analysis of thus received data, adjust the temperature of feed into the unit and/or water spray into the unit, and or one or more pump in the unit, so as to synchronize feed and draining pumps in the unit.

49. The system according to any one of the previous clauses, further comprising at least one evaporation unit arranged between the continuous flow biodiesel reactor and the continuous flow separation and purification unit.

50. The system according to the previous clause, wherein the evaporation unit comprises a flash evaporation unit.

51. The system according to any one of the previous clauses, further comprising at least one reactant high pressure pump, for providing a feed of reactants into the continuous flow biodiesel reactor and a reactant backpressure regulator to control the reactant pressure in the reaction channel and the system further comprising at least one thermal media high pressure pump, for providing thermal media into the thermal channel of the continuous flow biodiesel reactor and a thermal media backpressure regulator to control the pressure in the thermal channel of the reactor.

52. The system according to the previous clause, further comprising a control unit that is adapted to receive signal from said back pressure regulators and upon analysis of thus received data, adjust and synchronize the pressure in the reaction and thermal channels of the reactor by providing a control signal to the respective high pressure pumps to minimize differential pressure between the reactant channel and the thermal media channel.

53. The system according to any one of the previous clauses, wherein the continuous-flow biodiesel reactor unit is enclosed within a differential pressure equalizing chamber enabling high-pressure operation of the reactor.

54. The system according to the previous clause 53 wherein said control unit is further adapted to receive additional signal from pressure sensor(s) in said pressure equalizing chamber and upon analysis of thus received data, adjust the and synchronize the pressure in the pressure equalizing chamber with the pressure in the reaction and thermal channels of the reactor to minimize differential pressure between these channels.

55. A method for the continuous production of biodiesel, the method comprising:
   a. providing a continuous stream of reactants comprising free fatty acids and/or fatty acid glycerides comprising fat and/or oil into a biodiesel reactor, where the reactants are reacted with at least one alcohol and thus converted into fatty acid esters and/or transesterified fatty acid glycerides;

b. removing excess alcohol and/or water by evaporation to provide crude biodiesel; and
c. converting the resulting crude biodiesel to purified biodiesel by a continuous process that includes at least one separation step and at least one separation one wet washing step and at least one purification step.

56. The method of the previous clause, wherein the evaporation is performed by means of a flash evaporation drum.

57. The method of any one of the previous two clauses, wherein the washing and purification step comprises treatment with water, followed by treatment by at least one chromatographic resin, preferably an ion exchange resin.

58. The method of any one of the previous three clauses, wherein the process in step c) is performed by passing the raw biodiesel through a column that comprises a sequential assembly that includes at least one separation section, at least one wet wash section and at least one dry section.

59. The method of any one of the previous four clauses, wherein the method is performed by using a system as set forth in any one of the clauses 1-54.

The invention claimed is:

1. A continuous flow biodiesel production and purification system comprising a tandem arrangement comprising at least one continuous flow modular biodiesel reactor unit and at least one continuous flow separation and purification unit, wherein the modular biodiesel reactor unit comprises a plurality of contact plates, comprising flow perturbing elements for enhancing turbulent mixing and, providing adjacent reactant channel and thermal channel for reactant mixture and thermal media for temperature control, respectively.

2. The system according to claim 1, wherein the continuous flow separation and purification unit is arranged in one column that comprises at least one separation section, at least one wet washing section and at least one dry washing/purification section.

3. The system according to claim 1, wherein the biodiesel reactor unit comprises a plurality of contact plates wherein surfaces of said contact plates provide catalytic activity for esterification and/or transesterification of free fatty acids and or transesterification of glycerides in said reactant channel provided by the contact plates for the reactant mixture.

4. The system according to claim 1, wherein the biodiesel reactor comprises a plurality of contact plates coated with at least one esterification and/or transesterification catalyst for catalyzing esterification of free fatty acids and or transesterification of glycerides.

5. The system according to claim 4, wherein the contact plates are arranged such that alternating coated sides face each other forming said reactant channel and two non-coated sides face each other forming said thermal channel, such that reactants flow between the coated sides of the contact plates along said reactant channel while thermal media for temperature control of the reactants flows through said thermal channel between the non-coated sides of the contact plates.

6. The system according to claim 1, further comprising one or more spacers and/or one or more static mixers for adjusting spacing between contact plates and enhancing turbulent mixing, respectively.

7. The system according to claim 6, wherein said one or more static mixer is placed between catalytic sides of two contact plates that face each other and provide a reactant channel.

8. The system according to claim 1, wherein said reactant channel is configured such that reactants can flow through two adjacent contact plates that are provided with at least one static mixer between them, and wherein said thermal channel is provided between two contact plates which provide the boundary to the adjacent reactant channel as to allow for thermal transfer between a thermal channel and an adjacent reactant channel.

9. The system according to claim 6, wherein the distance between adjacently arranged contact plates and static mixers is adjusted by means of an intermediate spacer.

10. The system according to claim 9, where the internal surface of said spacer provides a catalytic surface for esterification and/or transesterification of free fatty acids and or transesterification of glycerides.

11. The system according to claim 8, where the surface of said static mixers provides a catalytic surface for esterification and/or transesterification of free fatty acids and or transesterification of glycerides.

12. The system according to claim 1, where surfaces of said contact plates is mechanically roughened or roughened by other means on at least on one side.

13. The system according to claim 7, where internal surface of said one or more spacer is mechanically roughened or roughened by other means.

14. The system according to claim 7, where surfaces of said one or more static mixer is mechanically roughened or roughened by other means.

15. The system according to claim 1, wherein said contact plates providing a catalytic surface for esterification of free fatty acids are arranged to provide a first section of the system and said contact plates providing a catalytic surface for transesterification of glycerides, are arranged to provide a second section of the system.

16. The system according to claim 1, wherein said contact plates are corrugated, for increasing flow disturbance and turbulence for increased mixing.

17. The system according to claim 1, wherein said continuous-flow biodiesel unit comprises at least two reactors, wherein each reactor comprises non-coated contact plates, spacers and static mixers, whereby esterification with a homogeneous acid catalyst is effectuated in the first reactor and transesterification with a homogeneous basic catalyst is effectuated in the second reactor.

18. The system according to claim 1, wherein the biodiesel reactor comprises a pre-mixing inlet system for allowing mixing of reactants prior to and/or during their delivery into the reactor.

19. The system according to claim 1, wherein said biodiesel reactor unit accommodates as input either or both of triglycerides and free fatty acids, wherein said unit comprises at least one catalyst that catalyses transesterification of glycerides and at least one catalyst that catalyses esterification of free fatty acids.

20. The system according to claim 1, further comprising a reactant high pressure pump, for providing a feed of reactants into the continuous flow biodiesel reactor and a reactant backpressure regulator to control the reactant pressure in the reactant channel and the system further comprising a thermal media high pressure pump, for providing thermal media into the thermal channel and a thermal media backpressure regulator to control the pressure in the thermal channel.

21. The system according to claim 20, further comprising a control unit that is adapted to receive signal from said back pressure regulators and upon analysis of thus received data, adjust and synchronize the pressure in the reactant and thermal channels of the reactor by providing a control signal to the respective high-pressure pumps to minimize differential pressure between the reactant channel and the thermal media channel.

22. The system according to claim 1, wherein the continuous-flow biodiesel reactor unit is enclosed within a differential pressure equalizing chamber enabling high-pressure operation of the reactor.

23. The system according to claim 22, wherein said control unit is further adapted to receive signal from pressure sensor(s) in said pressure equalizing chamber and upon analysis of thus received data, adjust and synchronize pressure in the pressure equalizing chamber with the pressure in the reaction and thermal channels of the reactor to minimize differential pressure between these channels.

24. The system according to claim 2, wherein the continuous flow separation, wet washing and purification unit further comprises at least one feed pipe, through which untreated biodiesel is delivered into the unit, wherein the at least one feed pipe extends into said one column, at an angle that is about 90° to a longitudinal axis along the column.

25. The system according to claim 24, wherein the wet washing section comprises a grid of pipes comprising a plurality of nozzles for delivering a spray of water.

26. The system according to claim 25 where said grid of pipes is provided above and downstream from the separation section.

27. The system according to claim 2, wherein the wet washing section and the separation section are separated by at least one grating.

28. The system according to claim 2, wherein the dry washing/purification section comprises at least one resin material for removing impurities, residual water and/or small particles from the biodiesel.

29. The system according to claim 2, further comprising at least one heating unit, for controlling the temperature of reagent feed into the continuous flow separation and purification unit.

30. The system according to claim 2, further comprising at least one temperature sensor and at least one conductivity meter, and at least one control unit that is adapted to receive signal from the temperature sensor and conductivity meter and upon analysis of thus received data, adjust the temperature of feed into the unit and/or water spray into the unit, and or one or more pump in the unit, so as to synchronize feed and draining pumps in the unit.

31. The system according to claim 1, further comprising at least one evaporation unit arranged between the continuous flow biodiesel reactor unit and the continuous flow separation and purification unit.

32. A method for the continuous production of biodiesel, the method comprising:

a. providing a continuous stream of reactants comprising free fatty acids and/or fatty acid glycerides comprising fat and/or oil into a biodiesel reactor, where said reactants are reacted in a continuous turbulent flow with at least one alcohol and thus converted into fatty acid esters and/or transesterified fatty acid glycerides;
b. removing excess alcohol and/or water by evaporation to provide crude biodiesel; and
c. converting the resulting crude biodiesel to purified biodiesel by a continuous process that includes at least one separation step, at least one wet washing step and at least one purification step.

33. The method according to claim 32, whereby in step a) esterification of free fatty acids is catalyzed by introduction of sulfuric acid or other acid to said reactants.

34. The method according to claim 32, whereby in step a) transesterification of triglycerides and/or esterification of free fatty acids is promoted by catalytic activity of surfaces of contact plates confining a reaction channel in said biodiesel reactor, said catalytic activity provided by coating of said surfaces with suitable solid state catalysts and/or thermal treatment and chemical conversion of said surfaces to achieve suitable catalytic activity.

35. The method according to claim 32, whereby in step a) esterification of free fatty acids is conducted in a first step and transesterification of triglycerides in a second step whereby both steps are arranged in sequence in a continuous flow.

36. The method according to claim 32 where the reaction is carried out at elevated pressure with said reactants provided into said biodiesel reactor by a high-pressure pump and the pressure of the reactants is controlled by means backpressure regulation.

37. The method according to claim 36 where the reaction is carried out at elevated temperature with thermal media provided into a thermal channel by a high-pressure pump and the pressure of said thermal media is adjusted to match that of the reactants by means of backpressure regulation of the thermal media and synchronization with the backpressure regulation of the reactants.

38. The method according to claim 32, wherein following step a and b, the method comprises: converting the resulting crude biodiesel to purified biodiesel by a continuous process that includes said at least one separation step, said at least one wet washing step and said at least one purification step achieved in one separation, wet wash and purification column.

39. The method of claim 32, wherein the method is performed by using a system as set forth in claim 1.

* * * * *